US010917864B2

(12) United States Patent
Zhang et al.

(10) Patent No.: US 10,917,864 B2
(45) Date of Patent: Feb. 9, 2021

(54) METHOD AND DEVICE FOR REALIZING SYNCHRONIZATION

(71) Applicant: DATANG MOBILE COMMUNICATIONS EQUIPMENT CO., LTD., Beijing (CN)

(72) Inventors: Xiaojuan Zhang, Beijing (CN); Gang Wu, Beijing (CN); Xi Wang, Beijing (CN)

(73) Assignee: DATANG MOBILE COMMMUNICATIONS EQUIPMENT CO., LTD., Beijing (CN)

( * ) Notice: Subject to any disclaimer, the term of this patent is extended or adjusted under 35 U.S.C. 154(b) by 227 days.

(21) Appl. No.: 16/079,994

(22) PCT Filed: Feb. 14, 2017

(86) PCT No.: PCT/CN2017/073487
§ 371 (c)(1),
(2) Date: Aug. 24, 2018

(87) PCT Pub. No.: WO2017/143923
PCT Pub. Date: Aug. 31, 2017

(65) Prior Publication Data
US 2019/0075531 A1    Mar. 7, 2019

(30) Foreign Application Priority Data

Feb. 25, 2016   (CN) .......................... 2016 1 0105237

(51) Int. Cl.
*H04W 56/00*   (2009.01)
*H04B 7/26*    (2006.01)
(Continued)

(52) U.S. Cl.
CPC ............ *H04W 56/001* (2013.01); *H04B 7/26* (2013.01); *H04B 17/336* (2015.01);
(Continued)

(58) Field of Classification Search
None
See application file for complete search history.

(56) References Cited

U.S. PATENT DOCUMENTS 9,209,853 B1    12/2015  Noahalty et al.
2011/0194432 A1*  8/2011  Kato ................... H04W 74/002
                                                                370/252
(Continued)

FOREIGN PATENT DOCUMENTS

CN    101877687 A    11/2010
CN    102318233 A    11/2011
(Continued)

OTHER PUBLICATIONS

State IP Office of the P.R. China—International Search Report of the International Searching Authority, with an English translation of the International Search Report, dated Apr. 27, 2017 for International Application No. PCT/CN2017/073487 (5 pgs).
(Continued)

*Primary Examiner* — Alex Skripnikov
*Assistant Examiner* — Richard Schnell
(74) *Attorney, Agent, or Firm* — Womble Bond Dickinson (US) LLP (57) ABSTRACT

The invention relates to the technical field of communications, and more particularly, to a method and device for realizing synchronization. The method comprises: performing, by a base station, and according to an SRS signal transmitted by a terminal, filtering to obtain a RRU channel having the maximum receiving power in a current operation; upon determining that the RRU channel having the maxi-
(Continued)

mum receiving power in the current operation is different from a RRU channel used in the currently performed demodulation, refraining from performing immediate switching; and permitting switching of the RRU channel only when the receiving power of the RRU channel is determined to match the maximum threshold of a preset series of thresholds, and transmitting a TA command word to the terminal while switching the RRU channel to complete synchronization with the terminal. The invention prevents a terminal from frequently switching between RRU channels on a subframe basis. Moreover, a TA command word is transmitted while switching is being performed, thereby preventing a problem in which when a change in a RRU channel occurs, a TA command word is not received by a terminal for a long time, resulting in an asynchronous operation.

10 Claims, 4 Drawing Sheets

(51) Int. Cl.
*H04B 17/336* (2015.01)
*H04L 5/00* (2006.01)
*H04L 25/02* (2006.01)
*H04W 88/08* (2009.01)

(52) U.S. Cl.
CPC ........ *H04L 5/0051* (2013.01); *H04L 25/0224* (2013.01); *H04W 56/00* (2013.01); *H04W 56/006* (2013.01); *H04W 56/0045* (2013.01); *H04W 88/085* (2013.01)

(56) References Cited

U.S. PATENT DOCUMENTS

| | | | |
|---|---|---|---|
| 2013/0109402 A1* | 5/2013 | Zhou | H04W 72/04 455/452.2 |
| 2016/0242147 A1* | 8/2016 | Tarlazzi | H04W 72/04 |

FOREIGN PATENT DOCUMENTS

| | | |
|---|---|---|
| CN | 102387489 A | 3/2012 |
| CN | 102595590 A | 7/2012 |
| CN | 102318233 B | 1/2014 |
| CN | 104301270 A | 1/2015 |
| CN | 104427629 A | 3/2015 |

OTHER PUBLICATIONS

State IP Office of the P.R. China—Written Opinion of the International Searching Authority with an English translation dated Apr. 27, 2017 for International Application No. PCT/CN2017/073487 (3 pgs).

Huawei, IBM, Intel, Nokia Networks, NTT DOCOMO, Vodafone: "Mobile-Edge Computing", Introductory Technical White Paper, Sep. 2014, 36 pages.

* cited by examiner

METHOD AND DEVICE FOR REALIZING SYNCHRONIZATION

CROSS-REFERENCE TO RELATED APPLICATIONS

This patent application is a U.S. National Phase application under 35 U.S.C. § 371 of International Application No. PCT/CN2017/073487, filed on Feb. 14, 2017, designating the United States, entitled METHOD AND DEVICE FOR REALIZING SYNCHRONIZATION, which claims the priority of Chinese Patent Application No. 201610105237.5, filed with the Chinese Patent Office on Feb. 25, 2016 and entitled "A Synchronization Method and Device," the content of which was incorporated herein by reference.

FIELD

The present disclosure relates to the field of communications, and particularly to a synchronization method and device.

BACKGROUND

In a Long Term Evolution (LTE) system supporting high-speed rail running at a speed of up to 350 km/h, multi-cell combination technology is usually used to reduce signaling overhead caused by frequent handover of a terminal among cells, that is, multiple remote radio resource units (RRUs) are used to cover a cell. In spite of reducing signaling overhead caused by the handover, the conventional multi-cell combination technology also causes changes of power and delay of signal received by the terminal because the terminal needs to switch states between different cells, and between different RRUs covering a same cell. Since the terminal on the high-speed rail moves fast and stays in a single RRU for a short time, the power and delay of the signal received by the terminal may vary quickly, therefore, the terminal usually selects an RRU with a highest power to receive the signal.

Moreover, in order to synchronize the terminal with a base station, since an uplink Sounding Reference Signal (SRS) is periodical and consecutive, the base station typically estimates the delay between the terminal and the base station according to a primary path position estimated according to the SRS, and uses a Timing Advance (TA) command word to instruct the terminal to adjust its timing advance to be synchronized with the base station. The TA command word is usually transmitted periodically. If the periodicity is short, then the TA command would occupy a lot of time and frequency resources, increases the load of the base station's processor, and degrades a cell-level throughput. If the periodicity is long, then the TA would not be adjusted in a timely manner. Therefore, the periodicity is typically in seconds.

As such, when the conventional multiple-cell combination technology is used on high-speed rail, the base station might receive a plurality of RRU channel signals having different delays, thus possibly resulting in the following problems: 1) if the terminal just finishes transmitting the TA command word immediately before switching between the RRUs, then the terminal would not be able to adjust the TA for a long time after the switching; 2) if the terminal is proximate to a certain RRU, but the power of the RRU is lower than the power of an adjacent RRU due to a varying coverage area and a varying radio environment, then the base station might transmit the TA command word based upon a signal of the adjacent RRU; and 3) since the terminal may be switched between two RRUs at a position which is not the middle position between the two RRUs due to the different coverage areas of two RRUs, the terminal may be switched frequently at the sub-frame level. All the three problems above would lead to a channel for uplink demodulation of the base station and a channel for TA adjustment of the base station not being a same RRU channel, causing synchronization failure of the base station and the terminal, thus degrading the performance of uplink demodulation.

SUMMARY

Embodiments of the disclosure provide a synchronization method and device as follows.

An embodiment of the disclosure provides a synchronization method. The method includes: receiving, by a base station, an SRS transmitted by a terminal; selecting, by the base station, an RRU channel corresponding to a highest receiving power of the SRS; determining, by the base station, whether the RRU channel corresponding to the highest receiving power of the SRS is the same as an RRU channel for demodulation; determining, by the base station, whether a count of a counter corresponding to the RRU channel corresponding to the highest receiving power of the SRS is above a preset threshold, when the RRU channel corresponding to the highest receiving power of the SRS is determined to be different from the RRU channel for demodulation; using, by the base station, the RRU channel corresponding to the highest receiving power of the SRS as the RRU channel for demodulation, calculating, by the base station, a TA value according to a pilot signal of a Physical Uplink Shared Channel (PUSCH) and the SRS, and transmitting, by the base station, a TA command word to the terminal according to the TA value to be synchronized with the terminal, when the count is determined to be above the preset threshold. A count of a counter corresponding to an RRU channel represents the number of consecutive times that the RRU channel is determined to be corresponding to a highest receiving power of the SRS.

In the embodiment of the disclosure, the base station receives an SRS transmitted by the terminal, selects an RRU channel corresponding to the highest receiving power of the SRS, and determines whether the RRU channel corresponding to the highest receiving power of the SRS is the same as an RRU channel for demodulation. If they are determined to be the same, then the base station determines whether a count of a counter corresponding to the RRU channel corresponding to the highest receiving power of the SRS is above a preset threshold. Or if they are determined to be different, the base station uses the RRU channel corresponding to the highest receiving power of the SRS as the RRU channel for demodulation, calculates a TA value according to a pilot signal of a PUSCH and the SRS, and transmits a TA command word to the terminal according to the TA value to be synchronized with the terminal. A count of a counter corresponding to an RRU channel represents the number of consecutive times that the RRU channel is determined to be corresponding to a highest receiving power of the SRS. As such, the state of an RRU channel can be switched only when the number of consecutive times that receiving power of SRS received through the RRU channel is determined to be highest reaches the preset threshold. Comparing with switching a state of an RRU channel whenever receiving power of SRS received through the RRU channel is determined to be highest, the hysteresis of switching according to the embodiment of the disclosure can avoid frequency switching of the terminal between RRU channels at the sub-frame level. Furthermore, a TA command word is transmitted while the state of the RRU channel is being switched, thereby avoiding synchronization failure caused by the terminal unable to receive any TA command word for a long time due to the state switching of the RRU channel.

In an embodiment, after selecting the RRU channel corresponding to the highest receiving power of the SRS, and before determining whether the RRU channel corresponding to the highest receiving power of the SRS is the same as the RRU channel for demodulation, the method further includes: determining, by the base station, whether the RRU channel corresponding to the highest receiving power of the SRS is the same as an RRU channel selected as corresponding to a highest receiving power of a previously received SRS; and, adding one to the count of the counter corresponding to the RRU channel corresponding to the highest receiving power of the SRS, when the RRU channel corresponding to the highest receiving power of the SRS is determined to be the same as the RRU channel selected as corresponding to the highest receiving power of the previously received SRS; or, adding one to the count of the counter corresponding to the RRU channel corresponding to the highest receiving power of the SRS, and clearing counts of counters corresponding to all other RRU channels than the RRU channel corresponding to the highest receiving power of the SRS, when the RRU channel corresponding to the highest receiving power of the SRS is determined to be different from the RRU channel selected as corresponding to the highest receiving power of the previously received SRS.

In an embodiment, calculating the TA value according to the pilot signal of the PUSCH channel and the SRS includes: calculating a first synchronization position for a sub-frame under demodulation according to the pilot signal of the PUSCH channel; storing the first synchronization position and a number of a half-frame including the sub-frame upon determining that a decoding result of the sub-frame under demodulation is correct, where the first synchronization position represents an offset of a position for the base station to receive the pilot signal from a preset reference position; calculating a second synchronization position and a Signal to Noise Ratio (SNR) of the SRS according to the SRS; determining whether the SNR is above a first preset threshold; and, determining the second synchronization position as the TA value when the SNR is determined to be above the first preset threshold; or, determining whether a difference between the number of the half-frame including the sub-frame under demodulation and a number of a half-frame including the SRS is below a second preset threshold, when the SNR is determined to be equal to or lower than the first preset threshold, and calculating the TA value according to the first synchronization position and the second synchronization position when the difference is determined to be below the second preset threshold, where the second synchronization position represents an offset of a primary path position of the SRS from the preset reference position.

In an embodiment, calculating the TA value according to the first synchronization position and the second synchronization position when the difference is determined to be below the second preset threshold includes: calculating an absolute value of a difference between the first synchronization position and the second synchronization position; determining whether the absolute value of the difference is below a third preset threshold; and determining the second synchronization position as the TA value when the absolute value of the difference is determined to be below the third preset threshold; or, determining the first synchronization position as the TA value when the absolute value of the difference is determined to be equal to or above the third preset threshold.

In an embodiment, when determining whether the difference between the number of the half-frame including the sub-frame under demodulation and the number of the half-frame including the SRS is below the second preset threshold, the method further includes: determining that no valid TA value can be used, and transmitting no TA command word to the terminal, when the difference is determined to be above or equal to the second preset threshold.

An embodiment of the disclosure provides a synchronization device. The synchronization device includes a transceiver, a processor, and a memory for storing at least one instruction and in communication with the processor. The processor is configured to execute the at least one instruction to: control the transceiver to receive an SRS transmitted by a terminal; select an RRU channel corresponding to a highest receiving power of the SRS; determine whether the RRU channel corresponding to the highest receiving power of the SRS is the same as an RRU channel for demodulation; determine whether a count of a counter corresponding to the RRU channel corresponding to the highest receiving power of the SRS is above a preset threshold when the RRU channel corresponding to the highest receiving power of the SRS is determined to be different from the RRU channel for demodulation; use the RRU channel corresponding to the highest receiving power of the SRS as the RRU channel for demodulation, calculate a TA value according to a pilot signal of a PUSCH and the SRS, and control the transceiver to transmit a TA command word to the terminal according to the TA value to be synchronized with the terminal, when the count is determined to be above the preset threshold. A count of a counter corresponding to an RRU channel represents the number of consecutive times that the RRU channel is determined to be corresponding to a highest receiving power of the SRS.

In an embodiment, after the RRU channel corresponding to the highest receiving power of the SRS is selected, and before whether the RRU channel corresponding to the highest receiving power of the SRS is the same as the RRU channel for demodulation is determined, the processor is further configured to execute the at least one instruction to: determine whether the RRU channel corresponding to the highest receiving power of the SRS is the same as an RRU channel selected as corresponding to a highest receiving power of a previously received SRS; and, add one to the count of the counter corresponding to the RRU channel corresponding to the highest receiving power of the SRS, when the RRU channel corresponding to the highest receiving power of the SRS is determined to be the same as the RRU channel selected as corresponding to the highest receiving power of the previously received SRS; or, add one to the count of the counter corresponding to the RRU channel corresponding to the highest receiving power of the SRS, and clear counts of counters corresponding to all other RRU channels than the RRU channel corresponding to the highest receiving power of the SRS, when the RRU channel corresponding to the highest receiving power of the SRS is determined to be different from the RRU channel selected as corresponding to the highest receiving power of the previously received SRS.

In an embodiment, when the processor is further configured to execute the at least one instruction to: calculate a first synchronization position for a sub-frame under demodulation according to the pilot signal of the PUSCH channel; store the first synchronization position and a number of a half-frame including the sub-frame upon determining that a decoding result of the sub-frame under demodulation is correct, the first synchronization position represents an offset of a position for the base station to receive the pilot signal from a preset reference position; calculate a second synchronization position and an SNR of the SRS according to the SRS; determine whether the SNI is above a first preset threshold; and, determine the second synchronization position as the TA value when the SNR is determined to be above the first preset threshold; or, determine whether a difference between the number of the half-frame including the sub-frame under demodulation and a number of a half-frame including the SRS is below a second preset threshold, when the SNR is determined to be equal to or lower than the first preset threshold, and calculate the TA value according to the first synchronization position and the second synchronization position when the difference is determined to be below the second preset threshold, the second synchronization position represents an offset of a primary path position of the SRS from the preset reference position.

In an embodiment, when the processor is further configured to execute the at least one instruction to: calculate an absolute value of a difference between the first synchronization position and the second synchronization position; determine whether the absolute value of the difference is below a third preset threshold; and, determine the second synchronization position as the TA value when the absolute value of the difference is determined to be below the third preset threshold; or, determine the first synchronization position as the TA value when the absolute value of the difference is determined to be equal to or above the third preset threshold.

In an embodiment, when the processor is further configured to execute the at least one instruction to: determine that no valid TA value can be used, and transmit no TA command word to the terminal, when the difference is determined to be above or equal to the second preset threshold.

DETAILED DESCRIPTION OF THE EMBODIMENTS

To make the objects, technical solutions, and advantages of the embodiments of the disclosure clearer, the technical solutions according to the embodiments of the disclosure are described below with reference to the drawings. Apparently the embodiments to be described below are only a part but not all of the embodiments of the disclosure. Based upon the embodiments described herein, all the other embodiments which can occur to those ordinarily skilled in the art without any inventive effort shall fall into the scope of the disclosure.

It shall be appreciated that the technical solutions of the disclosure is applicable to various communication systems such as a Global System for Mobile communication (GSM), a Code-Division Multiple Access (CDMA) system, a Wideband Code Division Multiple Access (WCDMA) system, a General Packet Radio Service (GPRS), an LTE system, an Advanced LTE (LTE-A) system, a Universal Mobile Telecommunication System (UMTS), and etc.

It shall be further appreciated that in the embodiments of the disclosure, a terminal includes but is not limited to a Mobile Station (MS), a mobile terminal, a mobile telephone, a handset, portable equipment, and etc. The terminal can communicate with one or more core networks over a Radio Access Network (RAN). For example, the terminal can be a mobile phone (or a "cellular" phone) or a computer having a radio communication function, and the terminal can also be a portable, pocket, handheld, built-in-computer, or on-vehicle mobile device.

In the embodiments of the disclosure, a base station (e.g., an access point) can be a device in an access network that communicates with a radio terminal over one or more sectors via an air interface. The base station can be configured to convert a received air frame into an Internet Protocol (IP) packet, and to convert a received IP packet into an air frame, operating as a router between the radio terminal and remaining components of the access network, where the remaining components of the access network can include an IP network. The base station can also coordinate attribute management of the air interface. For example, the base station can be a Base Transceiver Station (BTS) in the GSM or CDMA system, or can be a Node B in the WCDMA system, or can be an evolved Node B (eNB) in the LTE system, although the disclosure makes no limitations to what the base station can be.

To address the existing problem that a channel for TA adjustment and a channel for uplink demodulation might be different RRU channels, which causes synchronization failure of the base station and the terminal, in the embodiments of the disclosure, the base station can allow a state of an RRU channel to be switched only upon determining that the number of consecutive times that receiving power of SRS received through the RRU channel is determined to be highest reaches the preset threshold, and transmits a TA command word to the terminal while switching the state of the RRU channel, thereby being synchronized with the terminal.

The inventive solutions are described below in details with reference to embodiments. Of course, the disclosure is not limited to the following embodiments.

Figure 1:
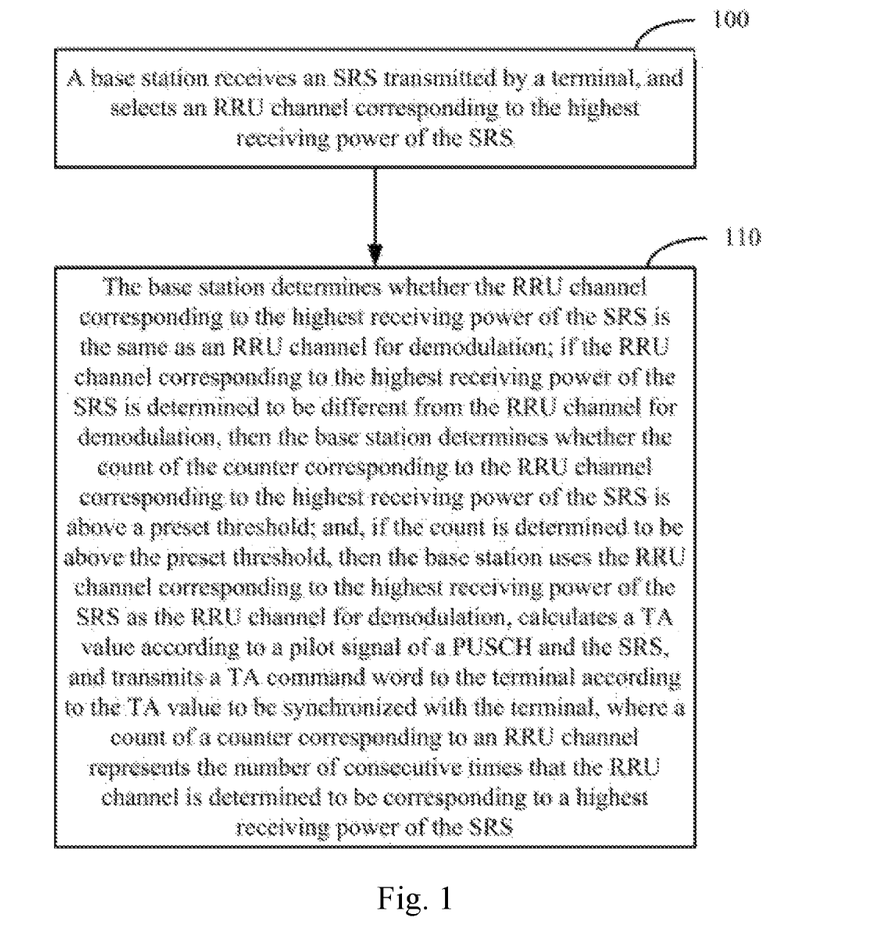
FIG. 1 is a general flow chart of a synchronization method according to an embodiment of the disclosure.

As illustrated by FIG. 1, a synchronization method according to an embodiment of the disclosure includes operations 100 and 110.

At the operation 100, a base station receives an SRS transmitted by a terminal, and selects an RRU channel corresponding to the highest receiving power of the SRS.

In practice, the SRS is transmitted by the terminal to the base station periodically, and the periodicity is determined according to higher-layer parameter configuration and is independent of uplink data transmission. Since the SRS is transmitted periodically, the base station typically detects a timing alignment state thereof with the terminal using the SRS.

After the terminal transmits the SRS to the base station, the base station calculates receiving power of the SRS received through each of all RRU channels, and selects the RRU channel corresponding to the highest receiving power of the SRS, i.e., the RRU channel through which the SRS received has the highest receiving power. The receiving power of the SRS received through each of all the RRU channels can be calculated in a conventional way, and the embodiment of the disclosure makes no limitations to the calculation methods, so a repeated description thereof is omitted herein.

After the operation 100 is performed, and before the operation 110 is performed, the method further includes the following operations.

The base station determines whether the RRU channel corresponding to the highest receiving power of the SRS is the same as an RRU channel selected as corresponding to a highest receiving power of a previously received SRS. If the RRU channel corresponding to the highest receiving power of the SRS is determined to be the same as the RRU channel selected as corresponding to the highest receiving power of the previously received SRS, the base station adds one to a count of a counter corresponding to the RRU channel corresponding to the highest receiving power of the SRS. Or, if the RRU channel corresponding to the highest receiving power of the SRS is determined to be different from the RRU channel selected as corresponding to the highest receiving power of the previously received SRS, the base station adds one to the count of the counter corresponding to the RRU channel corresponding to the highest receiving power of the SRS, and clears counts of counters corresponding to all other RRU channels than the RRU channel corresponding to the highest receiving power of the SRS.

As such, the number of consecutive times that receiving power of SRS received through an RRU channel is determined to be highest can be recorded.

At the operation 110, the base station determines whether the RRU channel corresponding to the highest receiving power of the SRS is the same as an RRU channel for demodulation; if the RRU channel corresponding to the highest receiving power of the SRS is determined to be different from the RRU channel for demodulation, then the base station determines whether the count of the counter corresponding to the RRU channel corresponding to the highest receiving power of the SRS is above a preset threshold; and, if the count is determined to be above the preset threshold, then the base station uses the RRU channel corresponding to the highest receiving power of the SRS as the RRU channel for demodulation, calculates a TA value according to a pilot signal of a PUSCH and the SRS, and transmits a TA command word to the terminal according to the TA value to be synchronized with the terminal. A count of a counter corresponding to an RRU channel represents the number of consecutive times that the RRU channel is determined to be corresponding to a highest receiving power of the SRS.

The operation 110 may include the following first to third operations.

At a first operation, the base station determines whether the RRU channel corresponding to the highest receiving power of the SRS is the same as the RRU channel for demodulation.

At a second operation, if the RRU channel corresponding to the highest receiving power of the SRS is the same as the RRU channel for demodulation, then the base station does not need to switch the state of the RRU channel corresponding to the highest receiving power of the SRS. Or, if the RRU channel corresponding to the highest receiving power of the SRS is different from the RRU channel for demodulation, then the base station determines whether the count of the counter corresponding to the RRU channel corresponding to the highest receiving power of the SRS is above the preset threshold.

At a third operation, if the count is determined to be lower than or equal to the preset threshold, then the base station does not switch the state of the RRU channel corresponding to the highest receiving power of the SRS. otherwise, the base station triggers switching of the state of the RRU channel corresponding to the highest receiving power of the SRS, that is, the base stations switches the state of the RRU channel corresponding to the highest receiving power of the SRS so that the RRU channel corresponding to the highest receiving power of the SRS is to be used as the RRU channel for demodulation, and the base station transmit the TA command word to the terminal while switching the state of the RRU channel, thereby being synchronized with the terminal.

In this way, the state of an RRU channel can only be switched when the number of consecutive times that receiving power of SRS received through the RRU channel is determined to be highest reaches the preset threshold. Comparing with switching a state of an RRU channel whenever receiving power of SRS received through the RRU channel is determined to be highest, the hysteresis of switching according to the embodiment of the disclosure can avoid frequency switching of the terminal between RRU channels at the sub-frame level.

Further, a TA command word is transmitted while the state of the RRU channel is being switched, thereby avoiding synchronization failure caused by the terminal unable to receive any TA command word for a long time due to the state switching of the RRU channel.

It is noteworthy that such transmission of the TA command word during state switching of the RRU channel does not conflict with periodic transmission of TA command words by the base station. In other words, according to the embodiment of the disclosure, the base station still transmits the TA command words periodically, but also transmits a TA command word while switching the state of the RRU channel.

As such, the terminal adjusts the time for transmitting a signal according to the TA command word transmitted by the base station, thus addressing the problem of synchronization failure and improving service performance.

Calculating the TA value according to the pilot signal of the PUSCH channel and the SRS includes the first to fourth operations below.

At a first operation, the base station calculates a first synchronization position for a sub-frame under demodulation according to the pilot signal of the PUSCH channel.

The first synchronization position represents an offset of a position for the base station to receive the pilot signal from a preset reference position.

At a second operation, the base station stores the first synchronization position and a number of a half-frame including the sub-frame upon determining that a decoding result of the sub-frame under demodulation is correct.

At a third operation, the base station calculates a second synchronization position and an SNR of the SRS according to the SRS, and determines whether the SNR is above a first preset threshold. If the SNR is determined to be above the first preset threshold, then the base station determines the second synchronization position as the TA value. Or, if the SNR is determined to be equal to or lower than the first preset threshold, the base station determines whether a difference between the number of the half-frame including the sub-frame under demodulation and a number of a half-frame including the SRS is below a second preset threshold.

The second synchronization position represents an offset of a primary path position of the SRS from the preset reference position.

At a fourth operation, when the difference is determined to be below the second preset threshold, the base station calculates an absolute value of a difference between the first synchronization position and the second synchronization position and determines whether the absolute value of the difference is below a third preset threshold. If the absolute value of the difference is determined to be below the third preset threshold, the base station determines the second synchronization position as the TA value. Otherwise, the base station determines the first synchronization position as the TA value.

Furthermore, if the base station determines that the difference between the number of the half-frame including the sub-frame under demodulation and the number of the half-frame including the SRS is above or equal to the second preset threshold, then the base station determines that no valid TA value can be used, and transmits no TA command word to the terminal this time.

The number of a half-frame represents time. For example, current time of a sub-frame is the sum of the number of a half-frame including the sub-frame and an offset of the sub-frame. As such, the first synchronization position can only be used as the TA value upon determining that the difference between the number of the half-frame including the sub-frame under demodulation and the number of the half-frame including the SRS is below the second preset threshold, which indicates that the sub-frame under demodulation is received at substantially the same time as the SRS.

Figure 2:
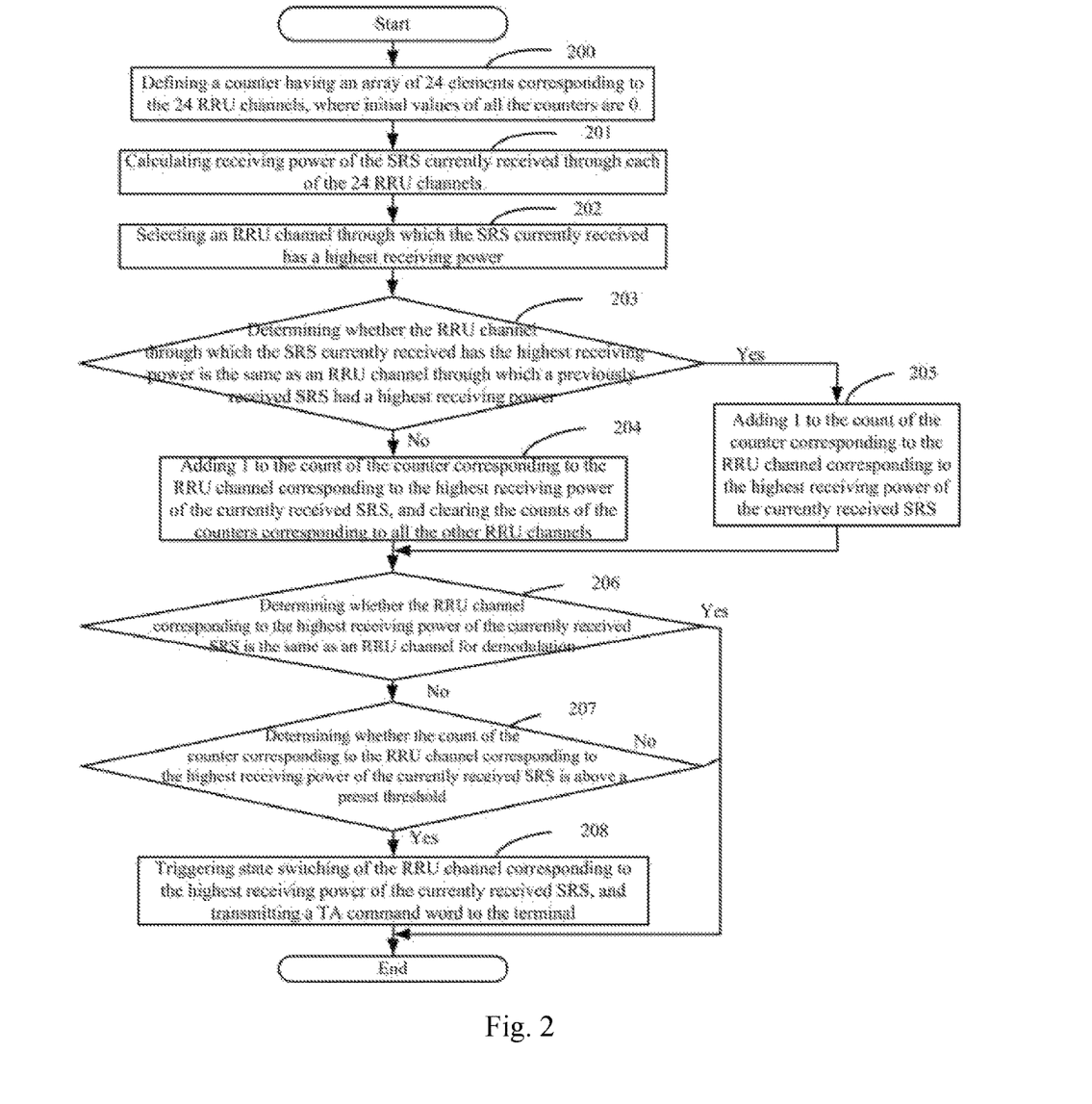
FIG. 2 is a detailed flow chart of a synchronization method according to an embodiment of the disclosure.

The embodiment above is described below in further details in connection with a particular application scenario. As illustrated by FIG. 2, a process of performing the synchronization method according to the embodiment of the disclosure is as follows.

For example, a high-speed cell has 24 RRU channels.

Operation 200: defining a counter having an array of 24 elements corresponding to the 24 RRU channels. Initial values of all the elements are 0. Each element is configured to record the numbers of times a highest receiving power of an SRS is received through a corresponding RRU channel, i.e., the array is denoted by: CNT–[$cnt_1$, $cnt_2$, . . . , $cnt_{24}$].

Operation 201: calculating receiving power of the SRS currently received through each of the 24 RRU channels. For example, the calculated receiving power of the SRS in an i-th SRS periodicity represented as: $P_i=[p_{rev0}, p_{rev1}, \ldots, p_{rev23}]$.

Operation 202: selecting an RRU channel through which the SRS currently received has a highest receiving power, and recording a channel number of the RRU channel, for example, $ant_{i, p\ max}$.

Operation 203: determining whether the RRU channel through which the SRS currently received has the highest receiving power is the same as an RRU channel through which a previously received SRS had a highest receiving power, and if the RRU channels are actually a same RRU channel, proceeding to the operation 205; otherwise, proceeding to the operation 204.

For example, the channel number of the RRU channel selected as corresponding to the highest receiving power of the previously received SRS is $ant_{i-1, p\ max}$, and if $ant_{i, p\ max} \neq ant_{i, p\ max}$, then proceeding to the operation 204; Or, if $ant_{i, p\ max} = ant_{i, p\ max}$, then proceeding to the operation 205.

Operation 204: adding 1 to the value of the element corresponding to the RRU channel corresponding to the highest receiving power of the currently received SRS, and clearing the values of the elements corresponding to all the other RRU channels.

Operation 205: adding 1 to the value of the element corresponding to the RRU channel corresponding to the highest receiving power of the currently received SRS.

Operation 206: determining whether the RRU channel corresponding to the highest receiving power of the currently received SRS is the same as an RRU channel for demodulation, and if so, then ending the flow, that is, the state of the RRU channel corresponding to the highest receiving power of the currently received SRS is not switched; otherwise, proceeding to the operation 207.

Operation 207: determining whether the value of the element corresponding to the RRU channel corresponding to the highest receiving power of the currently received SRS is above a preset threshold, and if so, then proceeding to the operation 208; otherwise, ending the flow, that is, the state of the RRU channel corresponding to the highest receiving power of the currently received SRS is not switched.

Operation 208: triggering state switching of the RRU channel corresponding to the highest receiving power of the currently received SRS, and transmitting a TA command word to the terminal.

Transmitting the TA command word to the terminal in the operation 208 includes: calculating a TA value according to a pilot signal of a PUSCH and the SRS, and transmitting the TA command word according to the TA value.

The TA command word can be calculated as specified in a protocol in use as long as the TA value is calculated.

Figure 3:
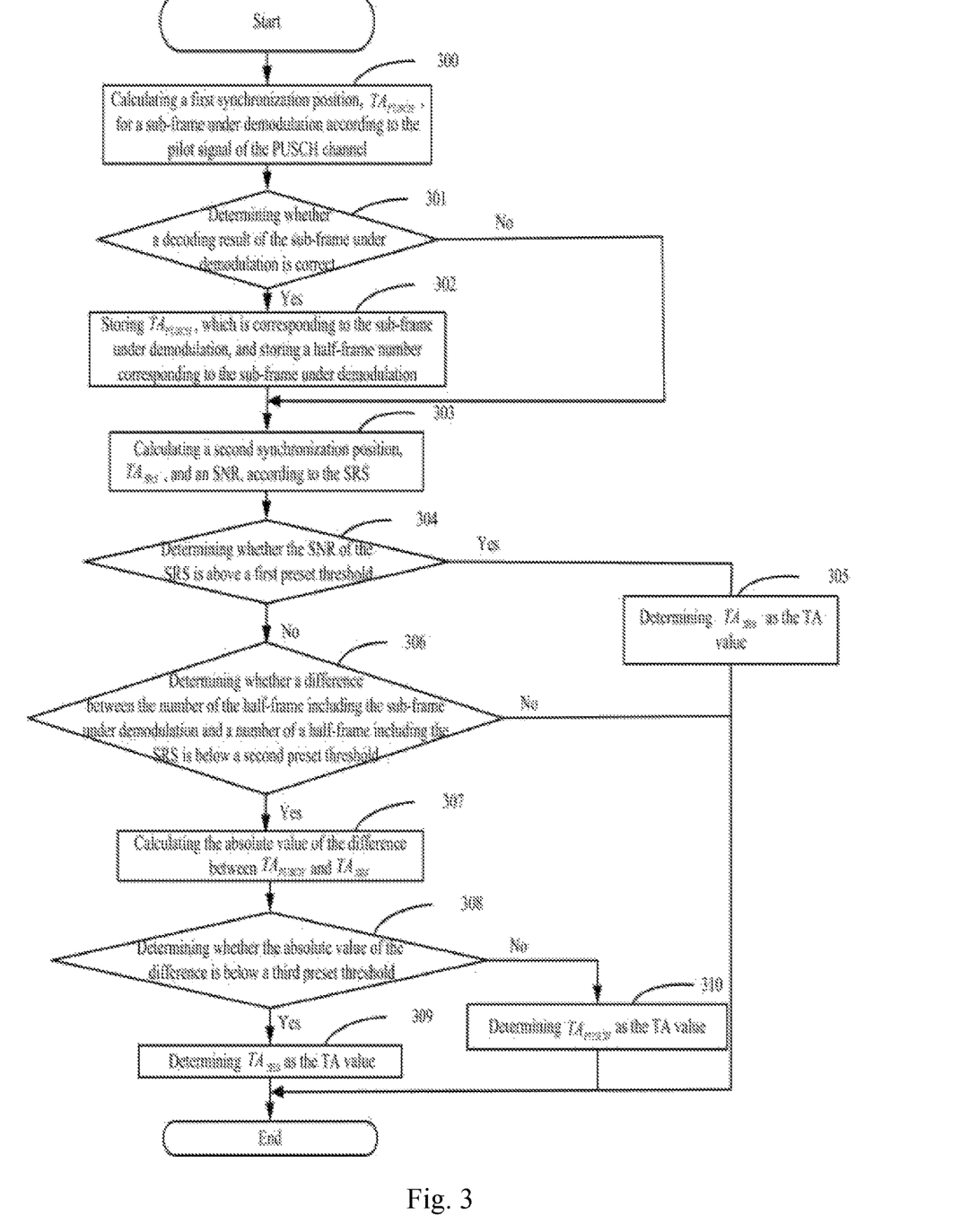
FIG. 3 is a flow chart of a method for calculating a TA value according to an embodiment of the disclosure.

As FIG. 3, a process of calculating the TA value according to an embodiment of the disclosure includes the operations 300-310.

Operation 300: calculating a first synchronization position, $TA_{PUSCH}$, for a sub-frame under demodulation according to the pilot signal of the PUSCH channel.

Operation 301: determining whether a decoding result of the sub-frame under demodulation is correct, and if so, proceeding to the operation 302; otherwise, proceeding to the operation 303.

Operation 302: storing $TA_{PUSCH}$, which is corresponding to the sub-frame under demodulation, and storing a half-frame number corresponding to the sub-frame under demodulation.

Operation 303: calculating a second synchronization position, $TA_{SRS}$, according to the SRS, and calculating an SNR of the SRS.

Operation 304: determining whether the SNR of the SRS is above a first preset threshold, and if so, proceeding to the operation 305; otherwise, proceeding to the operation 306.

Operation 305: determining $TA_{SRS}$ as the TA value.

Operation 306: determining whether a difference between the number of the half-frame including the sub-frame under demodulation and a number of a half-frame including the SRS is below a second preset threshold, and if so, proceeding to the operation 307; otherwise, ending the flow, that is, determining that no valid TA value can be used this time, and transmitting no TA command word to the terminal.

Operation 307: calculating the absolute value of the difference between stored $TA_{PUSCH}$, which is corresponding to the correctly decoded sub-frame, and $TA_{SRS}$.

Operation 308: determining whether the absolute value of the difference is below a third preset threshold, and if so, proceeding to the operation 309; otherwise, proceeding to the operation 310.

Operation 309: determining $TA_{SRS}$ as the TA value.

Operation 310: determining $TA_{PUSCH}$ as the TA value.

Figure 4:
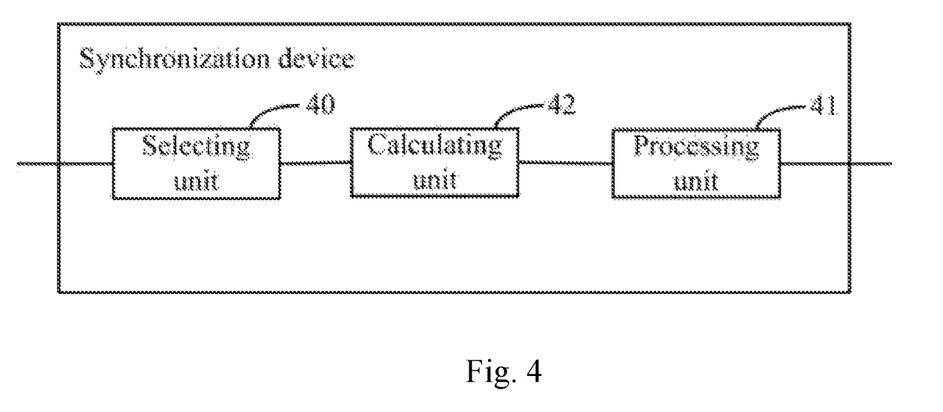
FIG. 4 is a schematic structural diagram of a synchronizing device according to an embodiment of the disclosure.

As illustrated by FIG. 4, an embodiment of the disclosure provides a synchronizing device. The synchronizing device includes a selecting unit 40 and a processing unit 41.

The selecting unit 40 is configured to: receive an SRS transmitted by a terminal, and select an RRU channel corresponding to a highest receiving power of the SRS.

The processing unit 41 is configured to: determine whether the RRU channel corresponding to the highest receiving power of the SRS is the same as an RRU channel for demodulation; determine whether a count of a counter corresponding to the RRU channel corresponding to the highest receiving power of the SRS is above a preset threshold when the RRU channel corresponding to the highest receiving power of the SRS is determined to be different from the RRU channel for demodulation; use the RRU channel corresponding to the highest receiving power of the SRS as the RRU channel for demodulation, calculate a TA value according to a pilot signal of a PUSCH and the SRS, and transmit a TA command word to the terminal according to the TA value to be synchronized with the terminal, when the count is determined to be above the preset threshold. A count of a counter corresponding to an RRU channel represents the number of consecutive times that the RRU channel is determined to be corresponding to a highest receiving power of the SRS.

In an embodiment, the device further includes a calculating unit 42. After the RRU channel corresponding to the highest receiving power of the SRS is selected, and before whether the RRU channel corresponding to the highest receiving power of the SRS is the same as the RRU channel for demodulation is determined, the calculating unit 42 is configured to: determine whether the RRU channel corresponding to the highest receiving power of the SRS is the same as an RRU channel selected as corresponding to a highest receiving power of a previously received SRS; and, add one to the count of the counter corresponding to the RRU channel corresponding to the highest receiving power of the SRS, when the RRU channel corresponding to the highest receiving power of the SRS is determined to be the same as the RRU channel selected as corresponding to the highest receiving power of the previously received SRS; or, add one to the count of the counter corresponding to the RRU channel corresponding to the highest receiving power of the SRS, and clear counts of counters corresponding to all other RRU channels than the RRU channel corresponding to the highest receiving power of the SRS, when the RRU channel corresponding to the highest receiving power of the SRS is determined to be different from the RRU channel selected as corresponding to the highest receiving power of the previously received SRS.

In an embodiment, when calculating the TA value according to the pilot signal of the PUSCH channel and the SRS, the processing unit 41 is configured to: calculate a first synchronization position for a sub-frame under demodulation according to the pilot signal of the PUSCH channel; store the first synchronization position and a number of a half-frame including the sub-frame upon determining that a decoding result of the sub-frame under demodulation is correct, the first synchronization position represents an offset of a position for the base station to receive the pilot signal from a preset reference position; calculate a second synchronization position and an SNR of the SRS according to the SRS; determine whether the SNR is above a first preset threshold; and, determine the second synchronization position as the TA value when the SNR is determined to be above the first preset threshold; or, determine whether a difference between the number of the half-frame including the sub-frame under demodulation and a number of a half-frame including the SRS is below a second preset threshold, when the SNR is determined to be equal to or lower than the first preset threshold, and calculate the TA value according to the first synchronization position and the second synchronization position when the difference is determined to be below the second preset threshold, the second synchronization position represents an offset of a primary path position of the SRS from the preset reference position.

In an embodiment, when calculating the TA value according to the first synchronization position and the second synchronization position when the difference is determined to be below the second preset threshold, the processing unit 41 is configured to: calculate an absolute value of a difference between the first synchronization position and the second synchronization position; determine whether the absolute value of the difference is below a third preset threshold; and, determine the second synchronization position as the TA value when the absolute value of the difference is determined to be below the third preset threshold; or, determine the first synchronization position as the TA value when the absolute value of the difference is determined to be equal to or above the third preset threshold.

In an embodiment, when determining whether the difference between the number of the half-frame including the sub-frame under demodulation and the number of the half-frame including the SRS is below the second preset threshold, the processing unit 41 is further configured to: determine that no valid TA value can be used, and transmit no TA command word to the terminal, when the difference is determined to be above or equal to the second preset threshold.

In summary, in the embodiment of the disclosure, the synchronizing device receives an SRS transmitted by the terminal, selects an RRU channel corresponding to the highest receiving power of the SRS, and determines whether the RRU channel corresponding to the highest receiving power of the SRS is the same as an RRU channel for demodulation. If they are determined to be the same, then the base station determines whether a count of a counter corresponding to the RRU channel corresponding to the highest receiving power of the SRS is above a preset threshold. Or if they are determined to be different, the base station uses the RRU channel corresponding to the highest receiving power of the SRS as the RRU channel for demodulation, calculates a TA value according to a pilot signal of a PUSCH and the SRS, and transmits a TA command word to the terminal according to the TA value to be synchronized with the terminal. A count of a counter corresponding to an RRU channel represents the number of consecutive times that the RRU channel is determined to be corresponding to a highest receiving power of the SRS. As such, the state of an RRU channel can be switched only when the number of consecutive times that receiving power of SRS received through the RRU channel is determined to be highest reaches the preset threshold. Comparing with switching a state of an RRU channel whenever receiving power of SRS received through the RRU channel is determined to be highest, the hysteresis of switching according to the embodiment of the disclosure can avoid frequency switching of the terminal between RRU channels at the sub-frame level. Furthermore, a TA command word is transmitted while the state of the RRU channel is being switched, thereby avoiding synchronization failure caused by the terminal unable to receive any TA command word for a long time due to the state switching of the RRU channel.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the optional embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A synchronization method, comprising:
   receiving, by a base station, a Sounding Reference Signal (SRS) transmitted by a terminal;
   selecting, by the base station, a Remote Radio Unit (RRU) channel corresponding to a highest receiving power of the SRS;
   determining, by the base station, whether the RRU channel corresponding to the highest receiving power of the SRS is the same as an RRU channel used for demodulation;
   determining, by the base station, whether a count of a counter corresponding to the RRU channel corresponding to the highest receiving power of the SRS is above a preset threshold, when the RRU channel corresponding to the highest receiving power of the SRS is determined to be different from the RRU channel for demodulation;
   using, by the base station, the RRU channel corresponding to the highest receiving power of the SRS as the RRU channel for demodulation; calculating, by the base station, a Timing Advance (TA) value according to a pilot signal of a Physical Uplink Shared Channel (PUSCH) and the SRS; and transmitting, by the base station, a TA command word to the terminal according to the TA value to be synchronized with the terminal, when the count is determined to be above the preset threshold,
   wherein the count of the counter corresponding to the RRU channel represents the number of consecutive times that the RRU channel is determined to be corresponding to the highest receiving power of the SRS.

2. The method according to claim 1, wherein after selecting the RRU channel corresponding to the highest receiving power of the SRS, and before determining whether the RRU channel corresponding to the highest receiving power of the SRS is the same as the RRU channel for demodulation, further comprising:
   determining, by the base station, whether the RRU channel corresponding to the highest receiving power of the SRS is the same as the RRU channel selected as corresponding to the highest receiving power of a previously received SRS; and
   adding one to the count of the counter corresponding to the RRU channel corresponding to the highest receiving power of the SRS, when the RRU channel corresponding to the highest receiving power of the SRS is determined to be the same as the RRU channel selected as corresponding to the highest receiving power of the previously received SRS, or
   adding one to the count of the counter corresponding to the RRU channel corresponding to the highest receiving power of the SRS, and clearing the counts of counters corresponding to all other RRU channels than the RRU channel corresponding to the highest receiving power of the SRS, when the RRU channel corresponding to the highest receiving power of the SRS is determined to be different from the RRU channel selected as corresponding to the highest receiving power of the previously received SRS.

3. The method according to claim 1, wherein calculating the TA value according to the pilot signal of the PUSCH channel and the SRS comprises:
   calculating a first synchronization position for a sub-frame under demodulation according to the pilot signal of the PUSCH channel;
   storing the first synchronization position and a number of a half-frame comprising the sub-frame upon determining that a decoding result of the sub-frame under demodulation is correct, the first synchronization position representing an offset of a position for the base station to receive the pilot signal from a preset reference position;
   calculating a second synchronization position and a Signal to Noise Ratio (SNR) of the SRS according to the SRS;
   determining whether the SNR is above a first preset threshold; and
   determining the second synchronization position as the TA value when the SNR is determined to be above the first preset threshold, or determining whether a difference between the number of the half-frame comprising the sub-frame under demodulation and a number of a half-frame comprising the SRS is below a second preset threshold, when the SNR is determined to be equal to or lower than the first preset threshold, and calculating the TA value according to the first synchronization position and the second synchronization position when the difference is determined to be below the second preset threshold, the second synchronization position representing an offset of a primary path position of the SRS from the preset reference position.

4. The method according to claim 3, wherein calculating the TA value according to the first synchronization position and the second synchronization position when the difference is determined to be below the second preset threshold comprises:
   calculating an absolute value of a difference between the first synchronization position and the second synchronization position;
   determining whether the absolute value of the difference is below a third preset threshold; and
   determining the second synchronization position as the TA value when the absolute value of the difference is determined to be below the third preset threshold, or
   determining the first synchronization position as the TA value when the absolute value of the difference is determined to be equal to or above the third preset threshold.

5. The method according to claim 3, when determining whether the difference between the number of the half-frame comprising the sub-frame under demodulation and the number of the half-frame comprising the SRS is below the second preset threshold, further comprises:
   determining that no valid TA value can be used, and transmitting no TA command word to the terminal, when the difference is determined to be above or equal to the second preset threshold.

6. A synchronization device, comprising:
   a transceiver;
   a processor; and
   a memory for storing at least one instruction and in communication with the processor, the processor configured to execute the at least one instruction to:
   control the transceiver to receive a Sounding Reference Signal (SRS) transmitted by a terminal;
   select a Remote Radio Unit (RRU) channel corresponding to a highest receiving power of the SRS;
   determine whether the RRU channel corresponding to the highest receiving power of the SRS is the same as an RRU channel used for demodulation;
   determine whether a count of a counter corresponding to the RRU channel corresponding to the highest receiving power of the SRS is above a preset threshold when the RRU channel corresponding to the highest receiving power of the SRS is determined to be different from the RRU channel for demodulation;
   use the RRU channel corresponding to the highest receiving power of the SRS as the RRU channel for demodulation; calculate a Timing Advance (TA) value according to a pilot signal of a Physical Uplink Shared Channel (PUSCH) and the SRS; and control the transceiver to transmit a TA command word to the terminal according to the TA value to be synchronized with the terminal, when the count is determined to be above the preset threshold,
   wherein the count of the counter corresponding to the RRU channel represents the number of consecutive times that the RRU channel is determined to be corresponding to the highest receiving power of the SRS.

7. The device according to claim 6, wherein after the RRU channel corresponding to the highest receiving power of the SRS is selected, and before whether the RRU channel corresponding to the highest receiving power of the SRS is the same as the RRU channel for demodulation is determined, the processor is further configured to execute the at least one instruction to:
   determine whether the RRU channel corresponding to the highest receiving power of the SRS is the same as the RRU channel selected as corresponding to the highest receiving power of a previously received SRS; and
   add one to the count of the counter corresponding to the RRU channel corresponding to the highest receiving power of the SRS, when the RRU channel corresponding to the highest receiving power of the SRS is determined to be the same as the RRU channel selected as corresponding to the highest receiving power of the previously received SRS, or
   add one to the count of the counter corresponding to the RRU channel corresponding to the highest receiving power of the SRS, and clear the counts of counters corresponding to all other RRU channels than the RRU channel corresponding to the highest receiving power of the SRS, when the RRU channel corresponding to the highest receiving power of the SRS is determined to be different from the RRU channel selected as corresponding to the highest receiving power of the previously received SRS.

8. The device according to claim 6, wherein the processor is further configured to execute the at least one instruction to:
   calculate a first synchronization position for a sub-frame under demodulation according to the pilot signal of the PUSCH channel;
   store the first synchronization position and a number of a half-frame comprising the sub-frame upon determining that a decoding result of the sub-frame under demodulation is correct, the first synchronization position representing an offset of a position for the base station to receive the pilot signal from a preset reference position;
   calculate a second synchronization position and a Signal to Noise Ratio (SNR) of the SRS according to the SRS;
   determine whether the SNR is above a first preset threshold; and
   determine the second synchronization position as the TA value when the SNR is determined to be above the first preset threshold, or
   determine whether a difference between the number of the half-frame comprising the sub-frame under demodulation and a number of a half-frame comprising the SRS is below a second preset threshold, when the SNR is determined to be equal to or lower than the first preset threshold, and calculate the TA value according to the first synchronization position and the second synchronization position when the difference is determined to be below the second preset threshold, the second synchronization position representing an offset of a primary path position of the SRS from the preset reference position.

9. The device according to claim 8, wherein the processor is further configured to execute the at least one instruction to:

calculate an absolute value of a difference between the first synchronization position and the second synchronization position;

determine whether the absolute value of the difference is below a third preset threshold; and determine the second synchronization position as the TA value when the absolute value of the difference is determined to be below the third preset threshold, or determine the first synchronization position as the TA value when the absolute value of the difference is determined to be equal to or above the third preset threshold.

10. The device according to claim 8, wherein the processor is further configured to execute the at least one instruction to:

determine that no valid TA value can be used, and transmit no TA command word to the terminal, when the difference is determined to be above or equal to the second preset threshold.

* * * * *